United States Patent

[11] 3,619,409

[72] Inventor Richard W. Stokeld, Jr.
 Wappingers Falls, N.Y.
[21] Appl. No. 831,535
[22] Filed June 9, 1969
[45] Patented Nov. 9, 1971
[73] Assignee Texaco Inc.
 New York, N.Y.

[54] HYDROCARBON SEPARATION PROCESS
 3 Claims, 1 Drawing Fig.
[52] U.S. Cl. ..................................... 208/95,
 208/143, 208/310, 260/676 MS
[51] Int. Cl. ....................................... C10g 23/00,
 C10g 25/04
[50] Field of Search ............................ 208/310,
 95, 143; 260/676 MS

[56] References Cited
UNITED STATES PATENTS

| | | | |
|---|---|---|---|
| 3,239,455 | 3/1966 | Lickus et al. | 208/310 |
| 3,369,998 | 2/1968 | Bercik et al. | 208/143 |
| 3,373,103 | 3/1968 | Cooper et al. | 208/310 |
| 3,392,112 | 6/1968 | Bercik et al. | 208/143 |

Primary Examiner—Herbert Levine
Attorneys—K. E. Kavanagh and Thomas H. Whaley

ABSTRACT: Improved method of separating straight chain hydrocarbons from mixtures thereof with nonstraight chain hydrocarbons involving a mild hydrogenation step, a severe hydrogenation step, followed by the molecular sieve separation and recovery of the straight chain hydrocarbons.

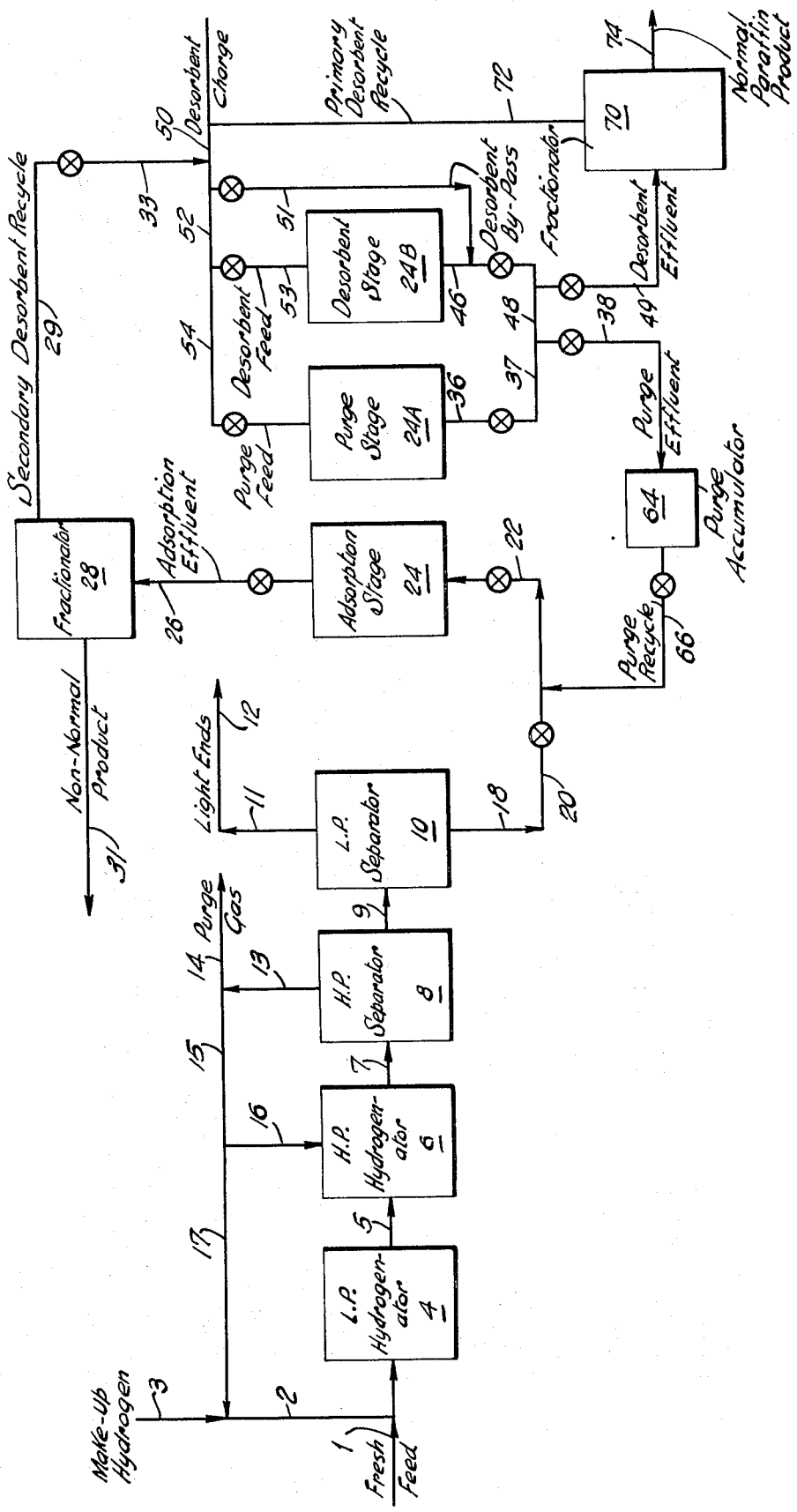

HYDROCARBON SEPARATION PROCESS

The present invention relates to an improved method of separating straight chain hydrocarbons from a mixture thereof with nonstraight chain hydrocarbons. More particularly, the present invention is directed to an improved vapor phase method of separating relatively long straight chain hydrocarbons from hydrocarbon mixtures at elevated temperatures and superatmospheric pressures using a molecular sieve selective adsorbent of Type 5A structure.

Is in known from U.S. Pat. No. 3,373,103, commonly assigned, that $C_{10}$–$C_{30}$ straight chain hydrocarbons can be separated from vapor phase mixtures thereof with nonstraight chain hydrocarbons by a method comprising the steps of adsorption, purge and desorption carried out at elevated temperatures.

It is known from U.S. Pat. No. 3,183,182 to hydrocatalytically desulfurize petroleum fractions containing 0.01 percent or more of sulfur to a sulfur content of 0.001–0.0015 percent prior to separation of the straight chain hydrocarbon components from the fraction by a molecular sieve selective adsorbent of Type 5A structure. Disclosed hydrogenation conditions include temperatures of 300°–480° C. (572°–896° F.), pressures of 50–2,000 p.s.i.g., space velocity of 0.5–20 v./v./hr. and a hydrogen flow rate of 50–10,000 s.c.f./bbl. using as the catalyst a sulfur resistant metal or metal compound having hydrogenating activity of Groups VIA and VIII of the Periodic Table on a refractory oxide support.

It has now been found that this method can be considerably improved with a resultant increase in product purity and increased product yield by the method of the present invention.

The improved method of the present invention broadly comprises in combination a series of two catalytic hydrogenation steps carried out under conditions hereinafter more fully defined, followed by an adsorption step, a depressurization step, a purge step, a repressurization step, and a desorption step. More specifically, the method of the present invention comprises a first or mild hydrogenation step wherein the petroleum fraction containing a mixture of straight chain and nonstraight chain hydrocarbons is mildly hydrogenated at a temperature from about 500 to about 850° F., a pressure in the range of from about 300 to 900 p.s.i.g. in the presence of a hydrogenation catalyst, e.g. a cobalt-molybdenum on alumina catalyst, the resulting first mild hydrogenated product is subjected to a second or severe hydrogenation step at a temperature from about 500° to about 850° F., and a pressure in the range of from about 1200 to about 2000 p.s.i.g. in the presence of a hydrogenation catalyst e.g. a nickel-tungsten on alumina catalyst; and thereafter the resulting second hydrotreated product at an elevated temperature and superatmospheric pressure in vapor phase is contacted in an adsorption step with a molecular sieve selective adsorbent to adsorb the straight chain hydrocarbon components of the mixture therefrom in the pores of said adsorbent; the adsorption step is terminated; a depressuring step wherein the pressure of the adsorption step is reduced to a value below that employed in the adsorption step; the depressuring step is discontinued; a purge step wherein the laden adsorbent is contacted with a straight chain hydrocarbon in vapor phase to remove surface-adsorbed hydrocarbons and hydrocarbons in the void spaces of the bed therefrom; the purge step is discontinued; a repressuring step wherein the purge pressure is increased to a value greater than the pressure of the purge step; repressurization is terminated; a desorption step wherein the adsorbed straight chain hydrocarbons from the selective adsorbent are desorbed in the vapor phase with a straight chain hydrocarbon having a molecular weight less that the molecular weight of the lightest straight chain hydrocarbon component of the adsorbed hydrocarbons; the desorption step is terminated; and repeating said operation in sequence.

The expression "surface-adsorbed hydrocarbons" as used hereinabove includes all adsorption on the sieve other than in the sieve cages (within the zeolite crystal). The expression includes all the nonnormal compounds adsorbed in the macropores of the sieve (intercrystalline pores) as well as those adsorbed on the surface.

The method of the present invention is particularly adaptable for the production of high-purity normal paraffins in excellent yields in a rapid, efficient and economical manner.

Accordingly, it is an object of the present invention to provide an improved hydrocarbon treating process. A further object is to provide an improved method of producing relatively high molecular weight straight chain hydrocarbons of a high degree of purity in commercially attractive yields from mixtures of such hydrocarbons and nonstraight chain hydrocarbons. A still further object is to provide an improved cyclic hydrocarbon separation process which is conducted in a relatively short period of time.

How these and other objects of this invention are accomplished will become apparent with reference to the accompanying disclosure. In at least one embodiment of the invention at least one of the foregoing objects will be achieved.

By "straight chain" hydrocarbon is means any aliphatic or acyclic or open chain hydrocarbon which does not possess side chain branching. Representative straight chain hydrocarbons are the normal paraffins and the normal olefins, mono- or polyolefins, including the straight chain acetylenic hydrocarbons. The "nonstraight chain" hydrocarbons comprise the aromatic and naphthenic hydrocarbons as well as the isoparaffinic, isoolefinic hydrocarbons and the like.

Straight chain hydrocarbon-containing mixtures which are suitably treated for the separation of straight chain hydrocarbons therefrom include the various petroleum fractions such as a naphtha or a gasoline fraction, a diesel oil fraction, a kerosene fraction, a gas oil fraction and the like. A typical hydrocarbon fraction which may be treated for the removal of straight chain hydrocarbons therefrom might have a boiling point or boiling range in the range 40°–600° F. and higher and contain a substantial amount of straight chain hydrocarbons, e.g., 2–35 percent by volume and higher. More particularly, a hydrocarbon fraction to be treated and containing straight chain hydrocarbons might have an initial boiling point in the range 40°–300° F. and an end point in the range of 150°–600° F. and higher. A hydrocarbon fraction treated for the removal of straight chain hydrocarbons therefrom might have the following composition:

| Hydrocarbon type | % by volume |
| --- | --- |
| Naphthenes | 0–75 |
| Aromatics | 0–50 |
| Acyclic saturates and unsaturates (including normal paraffins, isoparaffins, normal olefins and/or isoolefins) | 2–90 |

Typical refinery stocks or petroleum fractions which may be treated for the adsorptive separation of straight chain hydrocarbons therefrom are a wide boiling straight run naphtha, a heavy straight run naphtha, a light straight run naphtha, a catalytic cracked naphtha, a thermally cracked or thermally reformed naphtha, a catalytic reformed naphtha and the like, or a hydrotreated naphtha or diesel oil or kerosene or gas oil fraction including mixtures thereof.

The catalytic hydrogenation operation of the present invention is carried out in two stages, i.e., a mild hydrogenation step at a relatively high pressure prior to effecting the separation of the straight chain hydrocarbon from the resulting hydrogenated petroleum fraction.

In the low-pressure hydrogenation step, representative conditions include temperatures of 500°–850° F., preferably 600°–800° F., pressures of 300–900 p.s.i.g., preferably 400–750 p.s.i.g., a space velocity of from about 0.5–20, preferably 1–10 LHSV; (or Vo/hr./Vc); and a hydrogen rate of 100–10,000 s.c.f./bbl., preferably 500–4,000 s.c.f./bbl. The high-pressure hydrogenation step is carried out under comparable conditions of temperature, space velocity and hydrogen rate but the pressure in this stage should be considerably higher, that is, in the range of 1200–2000 p.s.i.g. and upwards, preferably between about 1300 and 1700 p.s.i.g.

Suitable catalysts for both of the hydrogenation steps may contain any of the oxides and/or sulfides of the transitional metals, particularly an oxide or sulfide of a Group VIII metal (especially cobalt and/or nickel) mixed with an oxide or sulfide of a Group VI B metal (especially molybdenum or tungsten). The catalytic metals are preferably supported on an adsorbent carrier in proportions ranging between about 1 percent and 25 percent by weight. Suitable carriers include the difficulty reducible inorganic oxides such as magnesia, alumina, silica, zirconia and titania, clays such as bauxite, bentonite and the like and mixtures. The carrier should be nonacidic and have little or no cracking activity.

The preferred carrier is activated alumina or activated alumina containing about 1 percent to 10 percent by weight of coprecipitated silica gel.

The preferred catalyst for the first hydrogenation stage is a cobalt molybdenum sulfide or oxide supported on activated alumina. The preferred second hydrogenation stage catalyst is a nickel tungsten sulfide or oxide on activated alumina or a silica-stabilized alumina.

In carrying out the process of the present invention it is particularly advantageous to subject the low pressure hydrogenation step effluent to the high pressure hydrogenation step without any intermediate pressure reduction and cooling steps to remove any formed light ends and/or formed sulfur and nitrogen compounds from the effluent.

The practice of the separation operation of the present invention is applicable to any solid selective adsorbent which selectively adsorbs straight chain hydrocarbons to the substantial exclusion of nonstraight chain hydrocarbons. This invention, however, is particularly applicable to a molecular sieve selective adsorbent comprising certain natural or synthetic zeolites or aluminosilicates, such as a calcium aluminosilicate, which exhibits the property of a molecular sieve, that is matter made up of porous crystals wherein the pores of the crystals are of molecular dimension and are of substantially uniform size. In general zeolites may be described as water-containing aluminosilicates having a general formula.

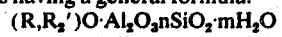

$$(R,R_2')O \cdot Al_2O_3 \cdot nSiO_2 \cdot mH_2O$$

wherein R may be an alkaline earth metal such as calcium, strontium or barium or even magnesium and wherein R' is an alkali metal such as sodium or potassium or lithium. Generally, these materials when dehydrated for the removal of substantially all of the water therefrom, retain their crystalline structure and are particularly suitable as selective adsorbents.

A particularly suitable solid adsorbent for straight chain hydrocarbons is a calcium aluminosilicate, apparently actually a sodium calcium aluminosilicate, marketed by Linde Company, and designated Linde Molecular Sieve Type 5A or 5A –45. The crystals of this particular calcium aluminosilicate have a pore size or opening of about 5A units, a pore size sufficiently large to admit straight chain hydrocarbons, such as the normal paraffins and the normal olefins, to the substantial exclusion of the nonstraight chain hydrocarbons, i.e., naphthenic, aromatic, isoparaffinic and isoolefinic hydrocarbons. This particular selective adsorbent is available in various sizes, such as in the form of one-eighth inch or one-sixteenth inch diameter extrusions, or as a finely divided powder having a particle size in the range of 0.5–5.0 microns. In general, a selective adsorbent employed in the practice of this invention may be in any suitable form of shape, granular, spheroidal or microspheroidal.

The separation method of the present invention should be carried out in the vapor phase and under essentially isothermal conditions. The particular operating conditions selected are dependent on the nature of the feed stream to the adsorption zone, the carbon number range of the feed stream and desired product stream as well as the carbon number distribution (relative amounts of each carbon number) within the range, the straight chain hydrocarbon content of the feed stream of the olefinic, sulfur, nitrogen and aromatic compounds content thereof. In general the feed stream to the separation unit should be relatively free from the lower molecular weight hydrocarbons such as in the range from about $C_1C_6$ as such light hydrocarbons complicate recovery of the desorbing medium.

In the accompanying drawing the single figure thereof illustrates a schematic flow diagram of the method of the invention.

In the drawing a vapor phase petroleum fraction composed of a mixture of straight chain and nonstraight chain hydrocarbons is fed by way of line 1 together with recycle hydrogen obtained by way of lines 17 and 2, and any makeup hydrogen obtained by way of lines 3 and 2, into a low pressure hydrogenation vessel 4 wherein the charge is catalytically hydrogenated in vapor phase at an elevated temperature and superatmospheric pressure to reduce the sulfur and nitrogen content.

The effluent is passed by way of line 5 into high-pressure hydrogenation vessel 6 wherein it is further catalytically hydrogenated in the presence of added hydrogen obtained by way of lines 16, 15 and 13 to saturate aromatics and olefins.

The high-pressure hydrogenation effluent is passed by way of line 7 to high-pressure separator 8 wherein hydrogen is separated and recycled by way of lines 13, 15, 16, 17 and 2 to the hydrogenation vessels. A bleed gas stream can be withdrawn from the recycled hydrogen in line 13 by way of line 14.

The remaining effluent is passed through line 9 to low-pressure separator 10 from which is withdrawn any light ends by way of lines 11 and 12, and a feed fraction by way of line 18. The feed fraction is passed from line 18 through line 20 to the adsorption vessel 24.

The hydrogenated mixture of relatively high molecular weight straight chain and nonstraight chain hydrocarbons in vapor phase is charged by way of lines 20 and 22 into the lower end of an adsorption vessel 24 maintained at an elevated temperature and superatmospheric pressure containing a bed of synthetic calcium sodium aluminosilicate of Type 5A structure such as a Linde 5A–45 Sieve therein. In the adsorption vessel 24 the straight chain components of the feed mixture are adsorbed by the selective adsorbent. From the outlet end of the vessel 24 through line 26 there is recovered a treated effluent mixture now containing a substantially reduced amount of straight chain hydrocarbons therein as well as desorbing medium present in the sieve cages from a previous desorption step and the effluent is passed to a fractionator 28 from which is recovered a nonstraight chain hydrocarbon product stream by way of line 31 which can be passed to a storage vessel now shown for use as a fuel source and a desorbent recycle stream by way of line 29 which can be returned to desorption feed line 50 by was of line 33. The desorbent medium present in the adsorption effluent is obtained from the previous cycle wherein during desorption, a portion of the desorbing medium is adsorbed by the sieve pores from which the higher molecular weight straight chain components have been removed.

At the completion of the adsorption step, hereinafter more fully described, the feed in line 20 to adsorption vessel 24 is discontinued. In the depressuring step, the vessel 24A is depressed by venting through lines 36, 37, 38 and accumulator 64 maintained at about atmospheric pressure. When vessel 24A is at the selected low pressure in the depressuring step, the purge step is begun. In the purging step, a stream of desorbing medium feed contained in lines 50, 52 and 54 is introduced countercurrent to the flow of the feed stream 20 into vessel 24A at a prescribed space velocity/purge volume ratio and a purge effluent stream is withdrawn therefrom by way of lines 36, 37 and 38 and passed to purge accumulator 64. At the end of the purge step, the repressuring step is commenced.

In the repressuring step, the flow of the stream of desorbing medium into vessel 24A by way of line 54 is continued to increase the pressure in the vessel to the selected desorbing pressure. When the selected desorbing pressure is attained in vessel 24A the desorption step is begun.

In the desorption step, the desorbing medium in the vapor state is passed through lines 50, 52 and 53 into the adsorbent vessel 24B containing the straight chain hydrocarbon components adsorbed by the selective adsorbent. The flow of the desorbing medium is also countercurrent to the feed flow during the adsorption step.

Countercurrent desorption flow (i.e. opposite to the flow in the vessel during adsorption) is highly desirable to assist in removing adsorbed straight chain hydrocarbons from the selective adsorbent.

The resulting desorption effluent is withdrawn from vessel 24B by way of line 46 and passes through lines 48 and 49 to fractionator 70 wherein the desorbate and desorbing medium are separately recovered. The adsorbed straight chain hydrocarbons in the desorbate are recovered by fractionator 70 by way of line 74. The desorbing medium is recovered by way of line 72 and can be returned to line 50 for further use.

At the termination of the desorption step, vessel 24B is depressured to attain the lower pressure used in the adsorption step and the cycle is repeated by introducing an additional quantity of fresh feed into vessel 24 by way of line 20 and line 22.

The adsorption step in the process of the present invention is carried out with the feed stream being the vapor phase.

The particular adsorption temperature used varies with the type of charge stock, carbon number content thereof, and desired range of the straight chain hydrocarbons to be recovered from the charge stock. However, it is necessary to carry out the adsorption step at a temperature above the dew point of the vaporized feed stream to minimize surface adsorption of the nonadsorbed hydrocarbons on the selective adsorbent and also to decrease the holdup of the charge stock in the sieve voids. A further requirement, which controls the upper temperature limit of the adsorption step is the need to avoid cracking of the charge stock. Keeping in mind these lower and upper temperature limitations, it has been found that a temperature range of about 575°–675° F. in the adsorption step will permit excellent separations.

In the adsorption step, the adsorption vessel should be maintained at a positive pressure above atmospheric pressure to permit the selective adsorbent to adsorb an additional quantity of normal straight chain hydrocarbons in the adsorption step. It has been found that maintaining the adsorption vessel at a pressure of between 10 to 50 p.s.i.g. during the adsorption step affords good results in terms of rapid adsorption of the adsorbable components of the feed stream by the selective adsorbent.

The charge stock is introduced into the adsorption vessel at a selected rate and the feed is continued until the selective adsorbent is loaded with normal straight chain components of the feed. Introduction of feed is preferably continued beyond the saturation point of the selective adsorbent for the normal straight chain hydrocarbon components of the feed and also beyond the point at which the straight chain components of the feed begin to "breakthrough" into the adsorption effluent (nonadsorbed portion of the feed). Introduction of the feed into the adsorption vessel is preferably terminated when there is a "normal paraffin overcharge" of between about 0.5 to 15 weight percent.

"Normal paraffin overcharge" is defined as the amount of n-paraffins in the feed stock to the adsorption vessel which is charged during the adsorption step is excess of the total amount on a weight basis of recovered normal paraffins during desorption and the normal paraffins recovered in the depressuring and purge effluent streams. The utilization of the selective adsorbent at maximum efficiency is a material factor in the process of the present invention because it compensates for the less than complete desorption of the adsorbed straight chain hydrocarbons in the subsequent desorption step. The overcharge range of 0.5–15 weight percent is suitable for excellent sieve utilization in a short processing time.

After termination of the adsorption step the adsorption vessel is depressured in a depressuring step to a lower pressure than the adsorption pressure. This depressuring step is required to remove some of the surface adsorbed nonnormal straight chain hydrocarbons from the selective adsorbent and to also begin to remove from the adsorption vessel, particularly from the void spaces between the selective adsorbent some of the unadsorbed portion of the charge stock while minimizing loss of the adsorbed straight chain hydrocarbons from the sieve pores.

The depressuring step is terminated when the adsorption pressure is decreased to about atmospheric pressure, and advantageously in the range of 0–10 p.s.i.g. The depressuring step is carried out at substantially the same temperature as was used in the adsorption step.

Following termination of the depressuring step, a purge step is begun using as the purge medium a vaporized stream of the material subsequently used as the desorbing medium. The purge step is carried out at substantially the same temperature as the adsorption and depressuring steps, and at the reduced pressure attained in the depressuring step. In this purge step a stream of the vaporized desorption medium is introduced into the adsorption vessel in a direction countercurrent to the flow of the charge stock thereto. The purge medium removes the remaining portion of the charge stock from the adsorption vessel and the surface adsorbed nonstraight chain components from the selective adsorbent. In the purge step it is necessary to maintain the purge medium in the vapor state for efficient operation and the flow rate thereof at a value between 50 and 100 VHSV (Vo/hr/Vc) and the purge medium volume at a value between 0.1 and 10 volumes and wherein the ratio of the purge medium rate to the purge medium volume is between 40/1 and 7000/1, preferably 50 to 3500/1, to minimize removal of the pore adsorbed straight chain components of the feed stream and to maximize removal of surface-adsorbed and the bed-entrapped contaminating components. The term "purge volume" refers to the amount of purge medium in the purge effluent stream per cycle and is equivalent to one vapor volume displacement (at purge conditions) of the total volume occupied by the sieve bed. Most efficient operations are conducted using a purge medium vapor velocity of 170 to 680 VHSV and a purge medium volume of 0.2 to 4.0 and a purge medium rate of purge medium volume ratio of at least 50/1, when it is desired to attain exceptionally high n-paraffin product purity. The effluent from the purge step comprising purge medium, unadsorbed charge stock and surface adsorbed components of the charge stock together with some adsorbed n-paraffins removed from the sieve pores by the purge medium is returned to the fresh feed line as a supplemental charge to the adsorption vessel. Routing of the purge effluent in this manner permits readsorption by the sieve of the normal straight chain hydrocarbon components of the feed that had been removed therefrom in the purge step. In addition the normal paraffins in the purge stream effluent are not lost to the process.

After completion of the purge step, the vessel is repressured to the desorption pressure which is advantageously about 20–75 p.s.i.g., and preferably about 1–20 p.s.i.g. above the highest pressure in the sieve vessel during the adsorption step. This repressuring step is necessary to permit more rapid desorption of the pore adsorbed straight chain components from the adsorbent and to facilitate removal of these components from the sieve by the desorbing medium in the desorption step. The desorption pressure is attained by discontinuing the flow of the purge effluent stream to the purge accumulator via line 38, while continuing the flow of purge medium vapor into the adsorption vessel. The rate of flow of the desorbing medium into the adsorption vessel is about 0.25–3 LHSV to remove the pore adsorbed straight chain hydrocarbons from the sieve. The desorption effluent comprising a mixture of desorbed straight chain hydrocarbons and desorbing medium is recovered from the adsorption vessel and then treated to separately recover the desorbing medium and the desorbed straight chain hydrocarbons.

In the desorbing step, the desorbing medium employed is essentially of the same composition as the purge medium. Use of the same hydrocarbon composition as the purge and desorption media avoids the problem of product contamination with other hydrocarbons while simplifying the processing requirements. Choice of a suitable desorption medium for use in the practice of the present invention is largely dependent on the composition of the fresh feed, avails thereof and desired end product carbon number distribution. In general it has been found that most advantageous results are obtained when the desorption medium has a composition comprising a major amount of a straight chain hydrocarbon or a mixture of straight chain hydrocarbons having an average of about one to three carbon atoms less than the lightest straight chain hydrocarbon in the fresh feed charge to the adsorption vessel. Maintaining a carbon number spread of about one to three between the purge-desorption media and the fresh feed charge lightest component permits effective and rapid desorption times in the process of the present invention is addition to affording ease of separation of the desorbing medium from the desired product stream by fractionation. Advantageously in the treatment of stream by fractionation. Advantageously in the treatment of $C_{10}$–$C_{15}$ charge stocks, a purge-desorption medium comprising about 80 percent by weight of normal heptane has been found to be satisfactory. In processing heavier stocks, e.g. $C_{14}$–$C_{20}$ containing stocks, a desorption medium composed of $C_{10}$–$C_{12}$ straight chain components has been found to give excellent results.

In the prior processes, the desorption step is generally the limiting factor in overall process time because of the amount of time required to effect removal of the adsorbed components from the sieve pores. The present process provides a means of shortening the desorption time period of prior processes by the combination of (a) using a desorbing medium in the vapor state and comprising in itself an adsorbable normal paraffin hydrocarbon and/or admixture of such normal paraffin hydrocarbons, (b) a desorption medium space velocity of 0.25 to 3 LHSV, and (c) additionally in terminating the desorption step when about 10–30 percent by weight of the pore adsorbed straight chain hydrocarbon components remain in the sieve pores. Such a desorbing combination will materially improve the desorption of the adsorbed straight chain components from the sieve pores. It has been found that at a desorption temperature of about 600° F. employing a n-heptane desorption medium in the desorption of n-$C_{10}$–$C_{15}$ components from the adsorbent pores at a desorption medium space velocity in the range of about 0.5–1.5 LHSV, volumes/hour/volume, the adsorbed components can be removed to the extent of 80–90 percent in from about 10–17 minutes; at a 05. LHSV in from about 17 to 26 minutes.

In the desorption step of the present invention, the flow of desorbing medium into the adsorption zone is countercurrent to the fresh feed charge which preferably is upflow. By operating in this manner the lighter straight chain hydrocarbon components of the charge adsorbed in the pores of the adsorbent during the adsorption step are first desorbed, and, in turn, they assist the desorbing medium in desorbing of the adsorbed heavier straight chain hydrocarbon components nearer to the desorption outlet end of the vessel. Termination of the desorption cycle short of essentially complete removal of adsorbed straight chain hydrocarbons from the sieve pores permits the time of desorption to be materially decreased, i.e. in the order of 25–80 percent. Moreover, the throughput of the charge can be materially increased with the result that more charge stock can be treated per operating day and more product streams can be obtained.

At the termination of the desorption step, the adsorption vessel is depressured to the adsorption pressure and the cyclic operation is repeated.

While the above detailed description of the process of the present invention has referred to a single vessel operation for simplicity, it is within the purview of the invention to produce same on a multivessel basis, wherein one or more separate vessels are used in each of the main process steps, i.e. adsorption, purge and desorption while another set of vessels are on a regeneration cycle. Periodic regeneration of the selective adsorbent is needed to restore and activity thereof after use in the process for an extended processing period. Suitable regeneration techniques known in the art such as, for example, the process disclosed in the Carter et al. U.S. Pat. No. 2,908,639 can be used.

The process of the present invention is essentially a timed cyclic process. It has been found that satisfactory results have been achieved if the adsorption step is accomplished in about one-third of the total processing time, the remaining two-thirds being taken up by the balance of the processing steps, e.g. depressure, purge, repressure, desorption, and depressure. In general in processing kerosene type charge stocks to recover the straight chain hydrocarbon components thereof it has been found that the following time sequence is advantageous: adsorption, 7.5 minutes; depressure, 0.5 minute; purge, 1.0 minute; repressure, 0.5 minute; desorption, 13 minutes, a total recycle time of 22.5 minutes.

In the desorption step of the present invention, it is particularly advantageous to carry out these steps in the following manner:

In the adsorption step, the values in lines 36, 46, 51, 53 and 54 are in the closed position. At the termination of the adsorption step the valve in line 51 opens and permits the desorbing medium maintained in the lines 50 and 51 under pressure and at elevated temperature, to be bypassed around the adsorption vessel. At the same time the valve in line 36 is opened to decrease the pressure in the adsorption vessel 24A (on the purge cycle). Then the valve in line 54 is opened to permit passage of a stream of desorbing medium into vessel 24A for the purging step. At the completion of the purging, step, the vessel is repressured by the flow of the stream of desorbing medium into the vessel until the desorption pressure is reached. The valves in lines 51 and 54 are then closed and the valves in lines 53 and 46 are opened substantially simultaneously with the closing of valves in lines 51 and 54. At the conclusion of the desorption step the valves in lines 53 and 46 are closed. Operating with this valve switching sequence permits the yield of high-purity normal paraffins to be increased without damaging the sieve bed by pressure variations during this portion of the cycle. This embodiment further permits use of low purge volume displacements during the purge step and minimizes the loss of adsorbed normal paraffins from the sieve pores during the purge cycle.

In carrying out the process of the present invention it has been found advantageous to employ a three sieve case system wherein one sieve case is on the adsorption cycle and the remaining two cases are on the desorption cycle (i.e. includes the depressure, purge, repressure and desorption steps). Operating with two cases on the desorption cycle permits a lower desorbing medium space velocity to be employed since the available desorption time is lengthened for a given total cycle time. The beneficial results obtained by operation in this manner include increased sieve utilization at a given desorption rate or lower desorption medium requirements at the same desorption rate. It is necessary to carry out desorption of the two sieve cases of the desorption cycle in parallel to prevent readsorption of the desorbed normal paraffins at the inlet of the second sieve case. Series desorption in the sieve cases is to be avoided for this reason.

EXAMPLE I

A kerosene feedstock was catalytically hydrogenated at 650° F., 500 p.s.i.g., a liquid hourly space velocity (LHSV) of 3, and a hydrogen feed rate of 1,200 s.f.c./bbl. in the presence of a cobalt-molybdenum on alumina catalyst. There was obtained from the hydrogenation effluent a hydrogenated charge stock having a 337°–539° F. boiling point range containing about 18 percent by weight of n-paraffins. Part of the hydrogenated charge stock was further treated by catalytic hydrogenation using a nickel tungsten sulfide on alumina catalyst under the following average conditions.

TABLE A

| | |
|---|---|
| Bed temperature, °F. | 697 |
| Pressure, p.s.i.g. | 1500 |
| Space velocity, Vo/Hr./Vc | 1.6 |
| Reactor feed gas, s.c.f./bbl. | 3100 |
| % $H_2$ in feed gas | 86.1 |
| $H_2$/hydrocarbon mol ratio | 4.5 |
| $H_2$ consumption, s.c.f./bbl. | 257 |

The high-pressure hydrogenated kerosene fraction was then subjected to a molecular sieve separation process using a Linde Company 5A-45 binderless sieve to separate and recover the straight chain hydrocarbon components from the nonstraight chain hydrocarbon components which are also separately recovered. Average conditions employed in the separation operation are set forth in the table below.

TABLE B

| | Temperature | Pressure p.s.i.g. | Space Velocity Vo/Hr./Vc | Time (mins.) |
|---|---|---|---|---|
| Adsorption | 600°–650° F. | 5 | 0.8 | 10.7 |
| Purge | 600°–650° F. | 0 | 0.6 | 4.0 |
| Desorption | 600°–650° F. | 15 | 0.6 | 17.4 |

The purge and desorbing medium employed was a hydrocarbon fraction containing 85 percent n-heptane, balance nonstraight chain hydrocarbons.

In the separation process during the purge step the amount of adsorbed straight chain hydrocarbons removed from the molecular sieve pores during the purge step was determined.

EXAMPLE II

Another portion of the high-pressure hydrogenated kerosene fraction was subjected to the separation process described in example I under similar conditions except that the purge volume in this example was 0.4 whereas the purge volume of example I was 2.2.

COMPARATIVE EXAMPLE A

Following the procedure of the above example, another portion of the kerosene feedstock was subjected only to mild catalytic hydrogenation under essentially the same conditions as those of example I. The resulting hydrogenated effluent then was subjected to the separation process of the preceding example. The amount of pore adsorbed straight chain hydrocarbons removed during the purge step was determined.

The table C below summarizes some of the data obtained during the separation process phase of the invention.

TABLE C

| Example | I | A | II |
|---|---|---|---|
| Purge volumes | 2.2 | 2.2 | 0.4 |
| Lbs. straight chain hydrocarbons adsorbed/100 lbs. sieve used | 3.50 | 3.50 | 3.50 |
| Wt. % adsorbed straight chain hydrocarbons removed by purge | 16.2 | 16.2 | 0.2 |
| Wt. % nonstraight chain hydrocarbons removed in purge | 94.4 | 85.8 | 85.8 |
| Straight chain hydrocarbon product purity, wt. % | 99.1 | 98.0 | 98.0 |
| Sieve utilization value, lbs. straight chain hydrocarbon/day/lb. sieve | 1.32 | 1.32 | 1.57 |

Inspection of the data in table C for example I shown that 94.4 percent of the nonstraight chain hydrocarbons were removed during the purge step in comparison with only 85.8 percent for Comparative example A. In addition the purity of the straight chain hydrocarbon product of example I was 99.1 percent in contrast to the 98 percent purity value of example A. It is especially significant that the amount of nonstraight chain hydrocarbons removed in the purge step of example I is 10 percent more than that attained in example A.

The data of example II in table C shown that at a purge vapor volume of only 0.4 one can attain the same degree of nonstraight chain hydrocarbons removal in the purge as in example C, with a marked decrease in loss of the n-straight chain hydrocarbons during the purge step. Only 0.2 percent of the straight chain hydrocarbons are lost in example II, compared to the 16.2 percent loss for example A, an improvement by a factor of 81. Further the sieve utilization value is increased from 1.32 of example A to 1.57 for example II, a 19 percent increase in production rate while maintaining a product purity of 98 percent.

Obviously, many modifications and variations of the invention as hereinbefore set forth may be made without departing from the spirit and scope thereof and therefore only such limitations should be imposed as are indicated in the appended claims.

I claim:

1. An improved method of separating straight chain hydrocarbons from mixtures with nonstraight chain hydrocarbons which comprises a mild hydrogenation step wherein the petroleum fraction containing a mixture of straight chain and nonstraight chain hydrocarbons in mildly hydrogenated in vapor phase at a temperature of from about 500° to about 850° F., a pressure in the range of from about 300 to 900 p.s.i.g. in the presence of a hydrogenation catalyst, the resulting first mild hydrogenated product is subjected to a second or severe vapor phase hydrogenation step at a temperature of from about 500° to about 850°° F., and a pressure in the range of from about 1,200 to about 2,000 p.s.i.g. in the presence of a hydrogenation catalyst and thereafter the resulting second hydrotreated product at an elevated temperature and superatmospheric pressure in vapor phase is contacted in an adsorption step with a molecular sieve selective adsorbent to adsorb the straight chain hydrocarbon components of the mixture therefrom in the pores of said adsorbent; the adsorption step is terminated; a depressuring step wherein the pressure of the adsorption step is reduced to a value below that employed in the adsorption step; the depressuring step is discontinued; a purge step wherein the laden adsorbent is contacted with a straight chain hydrocarbon in vapor phase to remove surface-adsorbed hydrocarbons and hydrocarbons in the void spaces of the bed therefrom; the purge step is discontinued; a repressuring step wherein the purge pressure is increased to a value greater than the pressure of the purge step; repressurization is terminated; a desorption step wherein the adsorbed straight chain hydrocarbons from the selective adsorbent are desorbed in the vapor phase with a straight chain hydrocarbon having a molecular weight less than the molecular weight of the lightest straight chain hydrocarbon component of the adsorbed hydrocarbons; the desorption step is terminated; and repeating said operation in sequence.

2. The process of claim 1 wherein the mild catalytic hydrogenation step is carried out at a temperature of from about 600° to about 800° F. and a pressure in the range of from about 400 to about 750 p.s.i.g.

3. The process of claim 1 wherein the severe catalytic hydrogenation step is carried out at temperatures in the range from about 600° to about 800° F. and at a pressure in the range of from about 1,300 to about 1,700 p.s.i.g.

* * * * *

PO-1050
(5/69)

UNITED STATES PATENT OFFICE
CERTIFICATE OF CORRECTION

Patent No. 3,619,409　　　　　　　　　　Dated　November 9, 1971

Inventor(s)　Richard W. Stokeld, Jr.

It is certified that error appears in the above-identified patent and that said Letters Patent are hereby corrected as shown below:

| | |
|---|---|
| Col. 1, line 11 | Change "Is" to --it-- |
| line 19 | Change "0.0015" to --0.015-- |
| Col. 2, line 20 | Change "means" to --meant-- |
| line 66 | Change "high" to --low-- |
| Col. 3, line 13 | Change "difficulty" to --difficultly-- |
| Col. 4, line 2 | Change "of" to --and-- |
| line 50 | Change "now" to --not-- |
| line 53 | Change "was" to --way-- |
| Col. 5, line 59 | Change "to" to --and-- |
| line 63 | Change "is to --in-- |
| Col. 6, line 28 | Change "100" to --1000-- |
| line 41 | Change "of" (first occasion) to --to-- |
| Col. 7, line 17 | Change "is" to --in-- |
| lines 19 & 20 | Omit "Advantageously in the treatment of stream by fractionation" |
| line 49 | Change "05." to --0.5-- |
| Col. 8, line 2 | Change "and" to --the-- |
| line 23 | Change "values" to --valves-- |
| Col. 10, line 33 | Change "in" (first occasion) to --is-- |

Signed and sealed this 2nd day of May 1972.

(SEAL)
Attest:

EDWARD M. FLETCHER, JR.
Attesting Officer

ROBERT GOTTSCHALK
Commissioner of Patents